United States Patent
Quinn et al.

[11] Patent Number: 5,176,188
[45] Date of Patent: Jan. 5, 1993

[54] INVESTMENT CASTING METHOD AND PATTERN MATERIAL COMPRISING THERMALLY-COLLAPSIBLE EXPANDED MICROSPHERES

[75] Inventors: John A. Quinn, Morganville; Roxy N. Fan, E. Brunswick, both of N.J.; John A. Lawton, Landenberg, Pa.

[73] Assignee: E. I. Du Pont de Nemours and Company, Wilmington, Del.

[21] Appl. No.: 655,688

[22] Filed: Feb. 14, 1991

[51] Int. Cl.$^5$ ................................. B22C 9/04
[52] U.S. Cl. ........................ 164/516; 164/34
[58] Field of Search ............ 164/34, 35, 45, 516

[56] References Cited

U.S. PATENT DOCUMENTS

| | | | |
|---|---|---|---|
| 3,426,834 | 2/1969 | Jacobs et al. | 164/235 |
| 3,822,138 | 7/1974 | Noguchi et al. | 106/38.8 |
| 3,942,583 | 3/1976 | Baur | 164/246 |
| 4,520,858 | 6/1985 | Ryntz, Jr. et al. | 164/34 |
| 4,763,715 | 8/1988 | Cannarsa et al. | 164/45 |
| 4,773,466 | 9/1988 | Cannarsa et al. | 164/45 |
| 4,787,434 | 11/1988 | Cleary et al. | 164/34 |
| 4,790,367 | 12/1988 | Moll et al. | 164/34 |
| 4,830,085 | 5/1989 | Cleary | 164/255 |
| 4,844,144 | 7/1989 | Murphy et al. | 164/35 |
| 4,854,368 | 8/1989 | Vezirian | 164/34 |
| 4,891,876 | 1/1990 | Freeman | 29/156.8 |
| 4,915,757 | 4/1990 | Rando | 156/64 |

FOREIGN PATENT DOCUMENTS

| | | |
|---|---|---|
| 507722 | 1/1975 | Japan . |
| 2116537 | 5/1990 | Japan . |
| 2207682 | 2/1989 | United Kingdom . |

OTHER PUBLICATIONS

Applications of Stereolithography in Investment Casting by Frost R. Prioleau, 37th Annual Technical Meeting: Investment Casting Institute 1989, pp. 1–5.
Investment Casting of Optical Fabrication and Stereolithography Models by Myron J. Bezdicek 37th Annual Tech. Mtg.: Investment Casting Institute 1989, pp. 1–8.
This Causes and Prevention of Shell Mould Cracking by the Green Mould Quality Sub-Committee, published by the British Investment Casting Trade Association, issued Aug. 1975.

*Primary Examiner*—Kuang Y. Lin

[57] ABSTRACT

A method and composition for forming investment casting patterns wherein thermally-collapsible microspheres are incorporated into the pattern composition. The patterns can be made either by conventional pattern forming techniques or by solid imaging techniques. After investing the microsphere containing pattern in the ceramic shell, the pattern and shell are heated, causing a collapse of the microspheres and thereby preventing cracking of the shell. The shell is then heated to burn-out the remaining pattern material and fire the shell, thereby creating a mold.

3 Claims, No Drawings

INVESTMENT CASTING METHOD AND PATTERN MATERIAL COMPRISING THERMALLY-COLLAPSIBLE EXPANDED MICROSPHERES

FIELD OF THE INVENTION

This invention relates to production of investment casting patterns comprising expanded thermally-collapsible microspheres and more particularly to a method of reducing ceramic shell mold failures due to cracking from pattern expansion during pattern melt-out or burn-out and firing of the mold.

BACKGROUND OF THE INVENTION

Investment casting by the "lost wax" process was first known to be used by the Egyptians and still finds practical utility today. The process involves many steps which may be summarized as follows:

a. Mold, carve, or machine a wax pattern.

b. Dip the wax pattern in a series of ceramic slurries in order to create a ceramic shell which is allowed to dry somewhat around the wax pattern.

c. Heat the ceramic shell and wax pattern in an oven or an autoclave until the wax melts and evacuates the ceramic shell.

d. Fire the ceramic shell.

e. Pour a melted alloy into the ceramic shell and allow it to solidify.

f. Break the ceramic shell to obtain the solidified alloy in the shape of the wax pattern.

Using investment casting techniques, parts may be molded having shapes that could not be molded by other techniques. Investment casting also offers the potential for manufacture of parts made from many different alloys. Currently, some of the problems involved with the investment casting process particularly related to the wax pattern are as follows a. Production of a wax pattern is time consuming if made by conventional machining techniques, and if the wax pattern is molded, shrinkage of the wax upon cooling creates loss of tolerances due to uneven solidification rates as it cools to a solid.

b. The wax is sometimes brittle and easily damaged before and during the ceramic slurry coating process. In addition the drying of the ceramic shell must be conducted under tightly controlled temperature conditions, since an increase in temperature of the wax pattern during the shell drying process may crack the shell due to pattern expansion. Also the ceramic slurry must easily wet the wax pattern to form a good mold that faithfully represents the pattern's shape and surface finish.

c. During the wax pattern removal stage, the wax must melt in such a manner as to not cause cracking of the mold due to the expansion of the pattern as it heats up.

d. During the ceramic shell firing, any wax that remains or has soaked into the shell must burn-off leaving very little residual ash.

Solid Imaging, or the direct production of objects or mold patterns from computer aided design data, holds promise to solve several of the problems mentioned above relative to use of wax patterns for investment casting. Many patents have issued in the field of solid imaging that describe the technologies' potential use in investment casting, but prior to the invention of a photoformable composition as described herein, no photoformable composition had been developed that would solve in particular the above described shell cracking problem.

In a patent assigned to DeSoto, Inc., Des Plaines, Ill. (U.S. Pat. No. 4,844,144, Jul. 4, 1989) there is proposed the use of a photosensitive ethylenically unsaturated liquid which solidifies to a thermoset shape upon exposure, in mixture with primarily a substantially inert low temperature thermoplastic material which becomes partially solidified or somewhat bound within the photosolidified thermoset matrix In this patent and in a publication "Investment Casting of Optical Fabrication and Stereolithography Models" by Myron J. Bezdicek of DeSoto (published by the Investment Casting Institute, 1989, 37th Annual Technical Meeting) it is proposed that the thermoplastic component of the photopolymer composition softens during melt-out or burn-out of the photoformed pattern and thereby weakens the thermoset structure of the pattern lessening the effects of expansion during subsequent heating. Although this approach is believed to provide an improvement when compared to the use of other photosensitive compositions to produce patterns for investment casting purposes, mold cracking still occurs and further improvements are necessary. The author and inventor propose other fixes such as block or flask casting, wax coating, and hollow-walled patterns, but for other practical reasons these fixes are not always desirable approaches for the investment caster.

U.K. Patent Application GB 2207 682 A (published Jun. 8, 1989) discloses a photosensitive composition, for use as a pattern for dental braces, in which one component of the pattern softens prior to burn-out of the pattern thereby preventing the build up of pressures that might cause shell cracking.

A patent application in Japan, which is a "laid open to public unexamined application" 2-116537 (Matsushita Electric Works), with a publication date of May 1, 1990, describes the advantages of using expandable microspheres, balloons, and/or rubber bead fillers, within a photocomposition to prevent shrinkage and the build-up of stresses during solid object formation by essentially solid imaging means Although the compositions described, specifically in the relation to the addition of Expancel ® microspheres to the composition, have similarities, the application does not discuss the use of these compositions for the production of investment casting patterns, and the applicants apparently were unaware of the rather surprising fact that the microspheres and/or balloons could be thermally collapsed in addition to being thermally expanded In addition, the application describes only ultrasound methods of keeping particles uniformly in a dispersion.

Other pertinent art is disclosed in U.S. Pat. No. 3,822,138 (Norguchi et al.) in which carbon microspheres are added to a wax pattern composition in order to reduce pattern shrinkage during pattern composition cooling in the mold. Although, such carbon microspheres may decrease pattern shrinkage during molding, they are not added to allow thermal collapse and reduction of pressures during pattern melt-out or pattern burn-out steps in an investment casting process as disclosed herein by the instant invention.

A published unexamined Japanese Application Kokai: 30 50-7722 (Published Jan. 27, 1975) describes a method by which surface blisters in a molded wax pattern can be reduced by mixing phenol-based or vinylidene chloridebase fine hollow resin spheres in the wax prior to molding. The publication describes excellent ways to mix and prepare the wax/hollow sphere compositions, however, the publication does not describe any advantages relative to the reduction of shell cracking during the melt-out and firing stages of mold production. Typically the phenol-based microspheres are thermoset and therefore not thermally-collapsible as described in this disclosure. And typically the vinylidene-chloride based microspheres, which generally have a glass transition temperature on the order of −15° C., have higher diffusion rates at room temperature. This greater diffusion rate would allow the blowing agent used to create the microsphere to escape, causing premature collapse of the spheres or replacement of the blowing agent with other gasses. The production of copolymer vinylidene-chloride and acrylonitrile hollow microspheres, which have lower diffusion rates at room temperature, was very difficult in 1973 when the above Japanese application was filed. However, in February 978 the Dow Chemical Company disclosed (U.S. Pat. No. 4,075,138, J. L. Garner) a method of making copolymer vinylidene-chloride and acrylonitrile hollow microspheres, which contained an isobutane blowing agent, in production quantities. It is these, or very similar, microspheres, herein disclosed, that are comprised in the pattern compositions of this invention and that aid in the reduction of shell mold cracking during the investment casting process.

Other pertinent art is disclosed in U.S. Pat. No. 4,790,367 (Moll et al.) wherein a foamed pattern is produced, coated with a silica slurry, packed in sand, and burned out using molten metal. In essence the process, which is termed a "Lost Foam" or "Lost Plastic" process, consists of the following steps:

1. Prepare the Plastic Material: By preparation of the plastic material, beads, typically consisting of PMMA or other resins containing an unexpanded blowing agent, are produced
2. Pre-expand the beads to a loose packed density of around 10% greater than used in the molded form.
3. Age the beads. This usually involves drying the pre-expanded beads.
4. Mold the beads. In this step the beads are pneumatically loaded into the mold and steamed, causing them to bond together into a foamed pattern.
5. Age the molded pattern. This typically involves drying the pattern.
6. Assemble the pattern parts.
7. Refractory coat the pattern. The refractory coating provides a smoother finish than would be given by the packed sand (from step 9 below) and helps contain the molten metal during the casting step.
8. Attach the gates, runners and sprues.
9. Pack the pattern, gates, runners and sprues with sand, which is vibrated to create greater compaction.
10. Pour the casting. In this step, the foam resins are effectively thermally degraded to lower molecular weight volatile components which are essentially burned out of the packed space and replaced by the molten metal. This disclosure describes methods and compositions to reduce carbon residue during this burn-out process.
11. Cool the casting.
12. Remove the sand from around the casting.
13. Clean the casting. U.S. Pat. No. 3,942,583 (Baur) discloses a similar "Lost Plastic" process in which foam pieces, such as foam plates, foam beams, foam columns, etc., are assembled together, then sand packed, and burned out by the pouring of the molten metal. Also U.S. Pat. Nos. 4,773,466 (Cannarsa et al.) and 4,763,715 (Cannarsa et al.) disclose a "Lost Foam" process utilizing alternative resins to form the foam beads. Although such art involves heat destruction of foamed patterns, the art does not disclose the reduction of shell mold cracking in an investment casting application utilizing thermally-collapsible microspheres mixed in a pattern composition.

Another U.S. Pat. No. 4,854,368 (Vezirian) discloses the added step of applying a vacuum during heat removal of a foamed pattern prior to filling the invested mold with metal. The added vacuum prevents decomposition products from entering the atmosphere. Other disclosures, such as U.S. Pat. No. 4,891,876 (Freeman), U.S. Pat. No. 4,830,085 (Cleary et al.), U.S. Pat. No. 4,787,434 (Cleary et al.), U.S. Pat. No. 4,520,858 (Ryntz, Jr. et al.), and U.S. Pat. No. 3,426,834 (L. J. Jacobs et al.) describe various other modes and methods of conducting "Lost Foam" casting to make various objects.

In a patent assigned to Spectra-Physics, Inc., San Jose, Calif. (U.S. Pat. No. 4,915,757 Apr. 10, 1990) there is described a process whereby small balls, microspheres, grains of sand, etc., initially bonded together by a wax or a weak cement within a block, are removed in selective regions by laser heating or blasts of impinging hot air in order to form three-dimensional models. No specific mention is made as to the utility of these models for investment casting purposes, and indeed the material of the balls does not appear to make the models produced by this method useful for investment casting applications, since there does not appear to be consideration of the thermal expansion characteristics required and the burn-out characteristics necessary relative to the materials proposed.

Also published by the Investment Casting Institute, 1989 at the 37th Annual Technical Meeting is a paper "Applications of Stereolithography in Investment Casting" by Frost R. Prioleau, of Plynetics Corporation, in which a "proprietary process" using stereolithography patterns for investment casting is mentioned. This process apparently reduces cracking of most shells, however, the need for new photopolymers with better "removability" is also stated.

An excellent insight into "The Causes and Prevention of Shell Mould Cracking" a materials and processes committee report is published by the British Investment Casting Trade Association (August 1975, Royton House, George Road, Edgbaston, Birmingham, B15, INU). This publication describes the effects of pattern wax on the mold shell during the various production steps and especially suggests that during the wax pattern melt-out from the ceramic shell mold, waxes should be chosen that have low thermal conductivity and high permeability into the ceramic shell. The thinking is that during the melt-out step, heat is transferred from the ceramic shell to the outer layer of the wax pattern causing the outer layer to melt. If just the outer wax layer melts first, without a substantial amount of heat being conducted into the inner region of the wax pattern, which would cause expansion and shell cracking, and if the outer wax layer can flow out of or permeate into the ceramic shell quickly enough, then shell cracking will be minimized.

It may be that shell mold cracking using the process suggested by DeSoto still occurs since, although the thermoplastic component of their patterns softens, there is still substantial resistance to flow or escape of this melted component due to constraint within the photo-thermoset matrix.

SUMMARY OF THE INVENTION

In accordance with this invention, a method of investment casting is provided which utilizes thermoplastic hollow thermally-collapsible microspheres within the pattern composition. The pattern is formed from materials comprising thermoplastic hollow thermally-collapsible microspheres by conventional means, using an investment casting pattern wax, or by solid imaging means, using photoformable compositions. Afterwards the pattern is coated with a series of ceramic slurries using conventional investment casting techniques. Upon heating of the cast mold and pattern, bringing portions of the pattern to an elevated temperature, the thermoplastic hollow thermally-collapsible microspheres collapse, thereby reducing the buildup of pressures within the mold and avoiding a tendency for the mold to crack. Upon further heating, the pattern material is burned-out from the ceramic mold and the mold is fired. Finally, the ceramic mold is filled with an alloy to cast a part using conventional investment casting methods.

Therefore, herein is proposed a method of forming an investment casting mold comprising the steps of:
 (a) placing a photoformable composition comprising thermally-collapsible microspheres in a vat;
 (b) forming a pattern by solid imaging means;
 (c) attaching said pattern to a gate and sprue, formed from a wax, in order to create a pattern cluster;
 (d) dipping said pattern cluster into ceramic slurries in order to create a stucco shell of ceramic layers;
 (e) heating said stucco shell and said pattern cluster to a temperature high enough to collapse said microspheres, melt said gate and sprue, and allow said wax to substantially drain from said stucco shell; and
 (f) firing said stucco shell in order to burn off the pattern and sinter said stucco shell in such a manner as to form the casting mold.

Furthermore, herein are proposed compositions for an investment casting pattern comprising:
 (a) a monomer
 (b) a photoinitiator; and
 (c) thermally-collapsible microspheres.

DETAILED DESCRIPTION OF THE INVENTION

As described in the summary, the present invention encompasses a method of investment casting wherein the pattern material, i.e., the material which is used to shape the interior contours of a ceramic mold useful for investment casting purposes, comprises thermally-collapsible microspheres as one of its components. The purpose of the thermally-collapsible microspheres is to provide a means of contraction of the pattern when the pattern is being melted or burned out of the ceramic mold.

The presently preferred thermally-collapsible microspheres are manufactured by Expancel (Nobel Industries Sweden, Sundsvall, Sweden). The Expancel ® microspheres consist of isobutane gas surrounded by a copolymer of vinylidene chloride and acrylonitrile shell. These microspheres can be obtained in unexpanded form and, as most preferred for the purposes of this invention, in expanded form. The vendor is capable of supplying the expanded microspheres, which are available in the range of 10-100 $\mu$m, in an expanded state. The plastic shell of the expanded microspheres is very thin, but the microspheres still retain considerable strength and will return to the expanded shape even after being compressed. Upon heating these expanded microspheres to a temperature, ranging typically above 124°-154° C., the microspheres release the isobutane gas and collapse.

It should be possible to utilize such expanded thermally-collapsible microspheres in conventional pattern waxes used in the investment casting industry. Typically wax patterns are made by pouring or injecting a wax, which is just at or slightly above its melting point, into a mold. Pouring the wax near its melting point is preferred since the pattern solidifies faster and there is less shrinkage during solidification. The melting point of most waxes is on the order of 49°-89 ° C., which is well below the collapse temperature of the microspheres. And the ability of the thermally-collapsible microspheres to withstand compression would allow a pattern composition comprising thermally-collapsible microspheres to be injected into the mold. Also, since the microspheres might comprise, for example, 25-30% of the pattern material volume, and the expanded thermally-collapsible microspheres exhibit little volumetric change upon, for example, cooling from a wax melt temperature to room temperature, it would be expected that the wax pattern as a whole would exhibit reduced shrinkage and therefore improved dimensional control.

Although the expanded thermally-collapsible microspheres might separate from the wax melt due to the marked difference in specific gravity (the expanded microspheres have a true density on the order of 30-50 kg/m$^3$), agitation of the wax in the melt state prior to molding (a common investment casting practice in order to maintain even temperature distribution while heating the wax), the use of specialized surfactants, or maintaining the wax in a pseudoplastic (shear-thinning) or toothpaste like condition (as is preferred for injection of the wax into the mold) would substantially diminish the separation of the expanded thermally-collapsible microspheres from the wax.

Use of the expanded thermally-collapsible microspheres in the pattern wax composition should not affect the surface finish of the pattern after molding since the wax would fill in the regions between the microspheres and the mold walls. However, if expanded thermally-collapsible microspheres are comprised in a wax pattern material that is machined to the pattern shape, a change in surface finish of the pattern might be expected, especially if larger particle expanded thermally-collapsible microspheres are utilized. In such cases it might be preferred to use, for example, Expancel ® 551 WE (or DE) 20 microspheres which have an average particle size of 10-20 $\mu$m.

Waxes that may be used in the thermally-collapsible microsphere dispersion are ozocerite waxes, petroleum waxes, rosin filled waxes, or any of a number of waxes with the possible exception of cranberry wax which has a melting point of over 200° C.. There are modern blends of such waxes that are commonly use in investment casting which comprise numerous components such as natural hydrocarbon waxes, natural ester waxes, synthetic waxes, synthetic and natural resins, organic filler materials and water. Hydrocarbon waxes, natural ester waxes, synthetic waxes and the resins used are usually compounds of straight chained carbon atoms but they could also be ring structured carbon atoms. The major criteria in the use of a wax are its shrinkage upon cooling, melting point, residual ash, hardness when solid, flowability, and viscosity (kinematic and dynamic).

Expancel ® is provided, by the vendor, with specific handling, pumping, and mixing instructions. Generally however, the appropriate amount, e.g, 25–30% by volume of wax, dry form of Expancel ® expanded microspheres would be transferred from the bag using vacuum to the mixing tank. Then the mixer would force the expanded microspheres down into the melted wax until the pattern composition is thoroughly mixed. Care should be exercised to ensure that the mixture temperature is substantially below the expanded microsphere collapse temperature. If unexpanded thermally-collapsible microspheres are first mixed in the wax, it should be possible to expand the spheres to a maximum size by raising the temperature to approximately the lowest T(max) by a process recommended by the vendor. The amount of unexpanded thermally-collapsible microspheres should be based however on the final volume mix desired for the wax pattern material when the microspheres are fully expanded.

Alternatively and more preferably, the pattern may be made utilizing solid imaging technology wherein the pattern material comprises the expanded thermally-collapsible microspheres within a photoformable composition. For example, the following photoformable composition was produced:

EXAMPLE 1

| Component | % by Wt. |
|---|---|
| Photomer ® 4127 (propoxylated neopentylglycol diacrylate, Henkel Corporation, La Grange, IL) | 8.3 |
| V-Pyrol ®/RC (N-vinyl-2-pyrrolidone GAF Chem. Corp., Wayne, NJ) | 24.5 |
| Plasthall ® 4141 (triethylene glycol dicaprate, triethylene glycol dicaprylate CP Hall Company) | 17.2 |
| Ebecryl ® 3704 (Bisphenol A bis(2-hydroxypropyl) diacrylate, Radcure Specialties Inc., Louisville, KY) | 23.6 |
| Ebecryl ® 3604 (rubber-modified acrylated epoxy oligomer, diluted with 20% tripropylene glycol diacrylate Radcure Specialties Inc., Louisville, KY) | 17.2 |
| Irgacure ® 651 (2,2-dimethoxy-2 phenylacetophenone, CIBA-Geigy Ltd., Switzerland) | 1.6 |
| Elvacite ® 2041 (polymethyl methacrylate Du Pont, Wilmington, DE) | 1.0 |
| PPC-0100 ® (polypropylene carbonate ARCO Chemical Co., Newtown Square, PA) | 5.1 |
| Expancel ® 461DE (Expancel, Sundsvall, Sweden) | 1.5 |

The three low-viscosity liquids, Photomer ® 4127, V-Pyrol ®/RC, and Plasthall ® 4141 were mixed together, and the solid polymers, Elvacite ® 2041 and PPC-0100 ®, were added and stirred at 120° F. until dissolved. After cooling to room temperature, the Ebecryls ® and Irgacure ® were added and stirred until dissolved. Finally the Expancel ® was added and stirred rapidly to disperse the expanded thermally-collapsible microspheres in the mixture. The stirring rate was then dropped to a low rate (50 rpm) to allow air bubbles to dissipate while maintaining the microspheres in suspension. The mixture was kept stirred at this low rate until used for making the patterns.

Although the above formulation comprises only 1.5% by weight of Expancel ® 461DE it comprises about 25–30% of the microspheres by volume. These microspheres may tend to come out of dispersion, due to the differences in specific gravity between the microspheres and the formulation remainder, unless mixed frequently. Mixing of the dispersion should be performed on the order of two to three times a day.

The above photoformable liquid formulation was placed in a vat and exposed with a focused UV laser beam, which was scanned in selective regions on the surface of the liquid thereby hardening those selective regions and creating a layer which represented a cross-section of the three-dimensional pattern. During this exposure, the first layer became attached to a platform that was positioned within the liquid one layer's thickness below the surface of the liquid. Although leveling of a photoformable liquid surface largely relies on natural flattening of the surface by surface tension effects, the application of the photoformable composition in layers in this case was accomplished by first dipping a long dispenser with a slot into the photoformable composition, raising the dispenser filled with composition above the composition surface level, and allowing the composition to flow from the dispenser through the slot while traveling in front of a doctor blade that smoothed the composition to the proper layer thickness above the platform or a previous photoformed layer. Once this first layer was formed, the platform was translated deeper into the liquid a distance of one layer thickness and a second layer of photosensitive liquid was formed on top of the previous layer. This liquid was then exposed selectively, creating another hardened layer, which represented the next cross-section of the three-dimensional pattern, and which attached to the surface of the previous layer. The process of platform movement, forming a liquid layer, selective exposure, etc. was continued until a three-dimensional pattern was produced.

Patterns produced by solid imaging means, for testing the utility of this photosensitive formulation for investment casting purposes were made from 10 mil thick layers and were approximately three inches by two inches by a third of an inch high. There are no indications that there is any limitation to the size of pattern that may be utilized or made by this process. And there are no indications that thick sections of the pattern will pose any particular problems. Therefore, it should not be necessary to produce hollow patterns or use special procedures to prevent shell cracking during the casting process, though such procedures may be used.

In the case described the laser beam was scanned across the surface of the vat in a manner similar to that described in the Hull (U.S. Pat. No. 4,929,402) with the exception that exposure control was utilized to modulate the beam spot in the image plane. Effectively, with exposure control, the laser beam is modulated digitally corresponding to a discrete distance that the beam has moved in the image plane. Since the modulation of the laser beam calls for the laser beam to be on for a specific time frame per digital pulse, the result is a substantially more uniform exposure, and more uniform depth and width of photoformation, per distance moved by the laser beam in the image plane. However, it is not necessary to provide the exposure by use of a laser. The exposure could be made by, for example, UV light exposure through or reflected from an appropriate photomask, or, other radiative exposure methods, such as, for example, x-rays, microwave or radio-frequency wave excitation, and the like may be used, assuming such radiation induces photoforming of the photoformable composition. Photomasks useful for the practice of this invention may be silver halide films (either transmitted through or backed by a mirror and reflected through), liquid crystal cells (reflective or transmissive), electrostatically deposited powders on a transparent web, ruticons, etc.

In this discussion a clear distinction should be made between a photoformable and a photoformed composition. The former refers to one which has not yet been subjected to irradiation, while the latter refers to one which has been photoformed by irradiation. Also a photoformable composition may be in the form of, for example, a liquid, a semi-solid, a paste, a non-photoformed solid, or a gel. These photoformable compositions preferably may exhibit non-Newtonian flow characteristics, as previously mentioned, such as pseudoplastic flow, plastic (Bingham body) flow, and/or thixotropic flow. Or, these photoformable compositions may be heat liquefiable, as long as the liquified flow temperature of the composition is below that of microsphere collapse temperature, such that the compositions are applied in layers in a liquefied state, but after coating and when cooled they solidify or form a near solid. Such compositions would generally remain heat liquefiable until exposed or photoformed, in which case they would not liquefy until much higher temperatures, if at all.

The patterns, made by solid imaging means as described above, were attached to separate wax gates and wax sprues creating a pattern cluster, then coated (invested) and dried six times according to conventional investment casting practice in a conventional ethyl silicate based slurry. Typically, the photoformed patterns, made from the above photoformable liquid, will have a molecular polarity or surface energy that is substantially higher than that of the investment casting wax patterns. The photoformed patterns will therefore be more easily wetted by the slurry during the coating process. For example, an investment casting wax produced by Lanxide (Newark, DE) 5550K-GRN-FLK was compared against the above photoformed pattern in terms of contact angle and surface energy. The surface energy of the wax was determined to be 35 dynes/cm whereas the photoformed pattern was determined to have a surface energy of 63 dynes/cm. When comparing the contact angle of both a polar liquid (distilled water) and a non-polar liquid (methylene iodide), it was found that the contact angle on the wax was approximately 40° higher than the contact angle measured on the photopolymer. Both measurements indicate that when the ceramic slurry is applied to the photoformed pattern, there will be improved wetting of the pattern surface, and therefore less tendency for voids in the slurry coating and greater surface definition in the casting and cast part. It is not necessary to attach the pattern to a wax gate and sprue, indeed such a gate and sprue could be fabricated from the thermally-collapsible microsphere containing composition by solid imaging means, however, formation of the gate and sprue in the casting mold is often advantageous for subsequent casting.

Next four samples of the invested, solid imaged, thermally-collapsible microsphere comprising formulation patterns, gates, and sprues were subjected respectively to four different types of heating and firing methods commonly used in investment casting practice. Typically the mold maker will heat the slurry coated and dried pattern cluster to an initial relatively low temperature, in an autoclave or oven, in order to melt out the wax sprue, gate, and pattern prior to firing the mold and in order to recover the wax and reduce the emissions. In the case of the solid imaged patterns made according to this invention, the pattern may not melt during the low temperature wax removal steps and therefore the wax can generally be recovered. However, the pattern may be burned out during mold firing.

The four methods of heating and firing the invested samples were as follows, with heating method b. and firing method d. being more preferred:

a. Heat in an autoclave at 300° F. and 80 psi. The pressure was brought up rapidly, in approximately 7 seconds, and maintained for 10 minutes. The wax gates and sprues melted out of the ceramic shell. The shell around the pattern did not crack.

b. Heat in an autoclave at 300° F. bringing the pressure up slowly, over a 5 minute period, to 80 psi and maintain for 10 minutes. The wax gates and sprues melted from the shell, without cracking the shell, even though this method of wax removal often does crack investment cast shells. The shell around the pattern did not crack. The ceramic shell and the pattern was then flash-fired at 1800° F. for two hours, sintering the shell and burning-out the pattern completely. This shell was later used for casting 17-4 stainless steel. The cast part showed excellent reproduction of the solid imaged thermally-collapsible microsphere pattern shape and surface texture, indicating that the pattern had burned out cleanly and was not affected the ceramic mold.

c. Heat in an oven slowly raising the temperature over a period of seven hours with the last two hours at 1800° F. The solid imaged thermally-collapsible microsphere pattern comprising shell did not crack during heating or firing. After firing the shell was deliberately cracked open. There was no noticeable ash left from the pattern and the interior surface of the ceramic mold appeared to have no adverse interaction with the pattern burn-out.

d. Flash-fire for two hours in a 1800° F. oven. The ceramic shell around the solid imaged thermally-collapsible microsphere comprising pattern did not crack and the mold produced was successfully used to cast a 17-4 stainless steel part.

As a control in each of the above heating and firing tests, a photosensitive composition, similar to that described in the DeSoto U.S. Pat. No. 4,844,144 Table I, was produced and used to form control patterns by solid imaging means in substantially the same manner, shape, and size as was used to produce the microsphere comprising patterns described above. These control patterns were attached to similar gates and sprues, and subjected to substantially the same heating and firing conditions. In every case, the ceramic shell around the control patterns cracked.

The Applicants propose the following explanation for the successful production of investment casting molds utilizing thermoplastic hollow thermally-collapsible microspheres comprised in the solid imaged pattern. However, this explanation should only be taken as a suggestion to the reader, and by no means, should the Applicants' explanation be construed as limiting in any way the breadth and scope of this invention.

During formation of the wax or solid imaged pattern comprising expanded thermally-collapsible microspheres, there is less tendency for shrinkage of the wax pattern during cooling, or of the solid imaged photoformable composition during photoforming, due to the presence of the microspheres, which make up a substantial portion of the volume of the pattern and which substantially do not change in volume during either the cooling or photoforming process.

It is believed that, during the heating of the pattern within the ceramic shell, since the thermally-collapsible microspheres are substantially insulating, there is a greater temperature differential, between the outer surface of the pattern and the pattern interior, than there would be with patterns that do not comprise such insulators. That is, the temperature at the microsphere comprising pattern surface may rise to a relatively high temperature prior to a significant temperature rise of the pattern interior. Furthermore, the temperature at the outer surface of the pattern is believed to rise above the collapse temperature of the thermally-collapsible microspheres prior to a significant temperature rise and therefore expansion of the pattern interior. It is the collapsing of the microspheres and the permeation of the gas out of the pattern surface and out of the ceramic shell that reduces the volume of the pattern and thereby prevents a pressure buildup within the shell during subsequent heating and expansion of the pattern interior.

In general then, a thermally-collapsible microsphere is a particle which retains a substantial degree of dimensional stability and resilience from the time of production, through periods of shipping, storage, mixing in with other components of a composition, forming (for example, molding into a pattern shape or photoforming into a pattern shape), and processing (for example, attaching to a sprue and gate and investing in a ceramic shell). Yet, the microsphere collapses when heated to a temperature, which temperature is substantially below the degradation temperature of the surrounding composition and preferably is a temperature low enough that substantial thermal expansion of the pattern does not occur. And when the microsphere is burned, it preferably leaves little or no ash.

The thermoplastic microspheres collapse and subsequent escape of the gas, originally comprised within the expanded thermally-collapsible microspheres, may be aided by a simultaneous melting of the outer surfaces of the pattern, since a softening of the pattern matrix, whether it be a wax or a solid imaged photoformed pattern, would allow the collapse of the microspheres and would enhance the permeation of the gas through the melted pattern material and through the ceramic shell. The presence of a plasticizer in a solid imaged pattern composition, e.g,. Plasthall 4141 in the above formulation, may aid the microsphere collapse and gas permeation, though a plasticizer may not be necessary. It may also be an advantage to comprise a thermoplastic component, within the solid imaged pattern composition, to aid in microsphere collapse, though it is not necessary. Another advantage to be expected from use of expanded thermally-collapsible microspheres, as part of the pattern composition, is an increase in impact strength in the pattern. This would reduce pattern breakage during handling and coating operations.

Surface treatment of the microspheres with surfactants may stabilize the dispersion for longer periods of time. A mixture in which the thermally-collapsible microspheres do not rise to the surface on standing could be made by substantially increasing the viscosity of the composition. For ease of coating during solid imaging, however, it is preferable to have the composition shear-thin during coating and to increase in viscosity when not being coated. Such pseudoplastic, or more correctly plastic flow behavior, of the photoformable composition comprising thermally-collapsible microspheres was achieved by, for example, incorporating approximately 14–25% by weight of polyethylene beads (for example Microfine ® MF-6X or Eftofine ® FT-600 FX from Trans Penn Wax Corporation of Titusville, Pa.) into the thermally-collapsible microsphere containing photoformable composition. Such photoformable compositions have been stable for over three months. Other additives to increase the shear thinning properties of the photoformable compositions may be used, however, there should be consideration of the residual ash of all additive materials during the burn-out and firing steps of mold production. For example, an alternative composition using PTFE powders such as Fluo 300 TM (Micro Powders Inc., Yonkers, N.Y.) would produce compositions with a face-cream like consistency. Although the burn-out temperature would likely be higher, these powders would still be useful as an additive in a photoformable investment casting composition.

The addition of 14–25% polyethylene beads to photoformable investment casting compositions gave improved stability, however, such compositions were "paste-like" in low shear rate conditions and not easily coated with conventional Solid Imaging coating apparatus. Also, there is concern that the use of large amounts of fillers may have an adverse effect on composition photospeed, imaging resolution, or part mechanical properties, such as for example, interlayer adhesion. On the other hand, there are organic additives which can be included in the photosensitive investment casting pattern compositions in relatively small amounts. These additives improve the stability of the thermally-collapsible microsphere containing compositions by imparting shear-thinning flow behavior characteristics. Three examples of such materials are Thixcin ® R, Thixatrol ® ST, and Thixatrol SR (RHEOX, Inc., Hightstown, N.J.). Thixin ® R (trihydroxy stearin) and Thixatrol ® ST are powdered organic derivatives of castor oil. Thixatrol ® SR is a proprietary mixture of 30% solids in cyclohexanol/petroleum stock. These materials are sold as thixotropes, however, viscosity tests performed with these agents added to a thermally-collapsible microsphere containing pattern composition exhibited either pseudoplastic or plastic flow behavior without a thixotropic loop. Generally, these agents are added to compositions at 0.2 to 0.8% by weight. Though for higher thixotropy index compositions, as much as 2.0% by weight agent may be added.

The following stock solution was formulated:

| Component | % by Wt. |
| --- | --- |
| Photomer ® 4127 (propoxylated neopentylglycol diacrylate, Henkel Corporation, La Grange, IL) | 8.7 |
| V-Pyrol ®/RC (N-vinyl-2-pyrrolidone GAF Chem. Corp., Wayne, NJ) | 26.2 |
| Plasthall ® 4141 (triethylene glycol dicaprate, triethylene glycol dicaprylate CP Hall Company) | 18.6 |
| Elvacite ® 2041 (polymethyl methacrylate Du Pont, Wilmington, DE) | 1.1 |
| Ebecryl ® 3704 (Bisphenol A bis(2-hydroxypropyl) diacrylate, Radcure Specialties Inc., Louisville, KY) | 43.7 |
| Irgacure ® 651 (2,2-dimethoxy-2 phenylacetophenone CIBA-Geigy Ltd., Switzerland) | 1.7 |

The first four components of the above stock solution were combined and stirred at 120° F. till well mixed and dissolved, then the remaining components were added and mixed. 150 gram portions of this stock solution were used in tests for Examples 2–4, in which the following quantities of the various thixotropes and microspheres were added.

EXAMPLES 2

2 grams of Thixcin ® R were added to the stock solution, then mixed in a Waring blender at fast speed for 20 minutes at 120°–130° F. The viscosity (after the compositions were allowed to rest for enough time to remove thixotropic effects) was measured using a Brookfield Digital Viscometer, Model DV-II with a #3 spindle from a LV spindle set. (The speed of 3 RPM and 30 RPM calculate to a shear rate of 0.63/sec and 6.3/sec respectively at the face of the spindle.)

@3 RPM the viscosity was 5,440 centipoise.
@30 RPM the viscosity was 1,420 centipoise giving a thixotropic index of 3.8.

Next, 2.25 grams of Expancel ® 461 DE were added while stirring with an average speed rotor and the following viscosity values were measured:

@3 RPM the viscosity was 12,400 centipoise.
@30 RPM the viscosity was 3,410 centipoise giving a thixotropic index of 3.6.

EXAMPLE 3

2 grams of Thixatrol ST were added to another portion of the stock solution and blended fast at 135° F. for 20 minutes.

Next, 2.25 grams of Expancel 461 DE were added and stirred with an average speed of rotor. Using the same equipment as in Example 2 above the following viscosity values were measured:

@3 RPM the viscosity was 7,210 centipoise.
@30 RPM the viscosit giving a thixotropic index of 2.9.

EXAMPLE 4

2.25 grams of Expancel ® 461 DE were stirred into another portion of the stock solution using an average speed of rotor. Using the same equipment as in Example 2 above the following viscosity values were measured:

@3 RPM the viscosity was 1,000 centipoise.
@30 RPM the viscosity was 715 centipoise giving a thixotropic index of 1.4.

The addition of the microspheres imparts a pseudoplastic or plastic flow characteristic to the photoformable composition.

Next 4 grams of Thixatrol ® SR were added to the mixture and stirred with a rapid rotor speed for 30 minutes at 120° F. The viscosity values measured were:

@3 RPM the viscosity was 3,910 centipoise.
@30 RPM the viscosity was 1,970 centipoise giving a thixotropic index of 2.0.

Each of the above solutions in Examples 2–4 were placed in separate brown bottles and examined periodically for separation. The solutions were rated OK if they appeared to have uniform opacity and NP (not preferred) if they exhibited a clear layer at the bottom of the solution. In the case where no thixotrope agent was added, the composition tested was that of Example 4 prior to the addition of Thixatrol ® SR.

| Solution Age | No Agent | Example 2 | Example 3 | Example 4 |
| --- | --- | --- | --- | --- |
| 2 hours | NP | OK | OK | OK |
| 1 day | NP | OK | OK | OK |
| 2 days | NP | OK | OK | NP |
| 4 days | NP | OK | OK | NP |
| 6 days | NP | OK | OK | NP |

The results of this testing suggest, that in solutions containing thermally-collapsible microspheres, that a thixotropic index of at least 2.0 is preferred and a thixotropic index of greater than 2.0 is more preferred. Naturally this conclusion will vary significantly based on the composition viscosity, in that generally higher viscosity solutions (in low shear-rate conditions) will have less tendency to separate. But even with such higher viscosity compositions, a thixotropic index of greater than 2.0 is more preferred since coating of solutions is preferably accomplished under the relatively high shear rate conditions that would be imparted by, for example, a doctor blade or a linear extrusion head. It should be clarified that while the term thixotropic index is utilized, the actual meaning of the index is a measurement of the tendency of the composition to shear-thin as a function of shear rate. In the cases sited, the thixotropic index is the ratio of the viscosity at the relatively high shear rate induced by a Brookfield Digital Viscometer Model DV2 operating at 30 RPM compared to the viscosity measured at 3 RPM. In this sense, no judgement can be made as to whether the compositions are thixotropic, pseudoplastic, or plastic flow (Bingham body) behavioral compositions. However, the compositions measured were clearly shear-thinning as opposed to Newtonian, dilatant, or rheopectic flow behavioral compositions.

It may be possible, in the case of solid imaged pattern compositions to comprise partially-expanded-thermally-collapsible microspheres in the formulation. In fact, the partially-expanded-thermally-collapsible microspheres are available from the vendor (Expancel). These microspheres could be, for example, only expanded to 50% of their maximum volume and mixed in the remainder of the photoformable formulation. During exposure, a localized temperature rise, created by light absorption and the heat of photoforming, might be generated such that the microspheres would be expanded to a larger volume, but not to so high a temperature as to cause thermal collapse of the microspheres.

This expansion of the microspheres during photoforming may effectively counteract the shrinkage that normally occurs during photoforming thereby producing a pattern of improved accuracy.

The percentage content of the thermally-collapsible microspheres, by volume, comprised within either a wax or photoformable composition need not be just 25–30% as preferred, a range between 5–40% is also preferred, and indeed the amount of thermally-collapsible microspheres by volume may be as much as 90% or as little as 1%. The important criteria of percent volume concentration within the pattern formulation is dictated by the method of pattern formation and handling requirements for the pattern. For example, if the thermally-collapsible microsphere dispersion in a wax is formed into a pattern by injection molding or by pour molding means, the concentration of microspheres should be dictated by the ability of the dispersion to flow into the mold and to accurately represent the mold contours and surface, and there should be sufficient casting wax in the dispersion to bond the thermally-collapsible microspheres, and allow handling of the finished pattern without damage during the subsequent investment casting steps. Likewise, for solid imaging formed thermally-collapsible microsphere containing patterns, the composition should be such that it can be coated in layers necessary for the solid imaging process. And there should be enough photoformable composition present to bond the thermally-collapsible microspheres together and allow cleaning and handling of the finished pattern without damage during subsequent investment casting steps. Use of as much as 90% by volume polyethylene beads in a photoformable composition is also possible and the same considerations as listed above apply.

A photoformable composition for solid imaging should contain at least one photoformable monomer or oligomer and at least one photoinitiator. For the purposes of this invention, the words monomer and oligomer have substantially the same meaning and they may be used interchangeably.

Examples of suitable monomers which can be used alone or in combination with other monomers include t-butyl acrylate and methacrylate, 1,5-pentanediol diacrylate and dimethacrylate, N,N-diethylaminoethyl acrylate and methacrylate, ethylene glycol diacrylate and dimethacrylate, 1,4-butanediol diacrylate and dimethacrylate, diethylene glycol diacrylate and dimethacrylate, hexamethylene glycol diacrylate and dimethacrylate, 1,3-propanediol diacrylate and dimethacrylate, decamethylene glycol diacrylate and dimethacrylate, 1,4-cyclohexanediol diacrylate and dimethacrylate, 2,2-dimethylolpropane diacrylate and dimethacrylate, glycerol diacrylate and dimethacrylate, tripropylene glycol diacrylate and dimethacrylate, glycerol triacrylate and trimethacrylate, trimethylolpropane triacrylate and trimethacrylate, pentaerythritol triacrylate and trimethacrylate, polyoxyethylated trimethylolpropane triacrylate and trimethacrylate and similar compounds as disclosed in U.S. Pat. No. 3,380,831, 2,2-di(p-hydroxyphenyl)-propane diacrylate, pentaerythritol tetraacrylate and tetramethacrylate, 2,2-di-(p-hydroxyphenyl)-propane dimethacrylate, triethylene glycol diacrylate, polyoxyethyl-2,2-di(p-hydroxyphenyl)propane dimethacrylate, di-(3-methacryloxy-2-hydroxypropyl)ether of bisphenol-A, di-(2-methacryloxyethyl)ether of bisphenol-A, di-(3-acryloxy-2-hydroxypropyl)ether of bisphenol-A, di-(2-acryloxyethyl)ether of bisphenol-A, di-(3-methacryloxy-2-hydroxypropyl)ether of 1,4-butanediol, triethylene glycol dimethacrylate, polyoxypropyltrimethylol propane triacrylate, butylene glycol diacrylate and dimethacrylate, 1,2,4-butanetriol triacrylate and trimethacrylate, 2,2,4-trimethyl-1,3-pentanediol diacrylate and dimethacrylate, 1-phenyl ethylene-1,2-dimethacrylate, diallyl fumarate, styrene, 1,4-benzenediol dimethacrylate, 1,4-diisopropenyl benzene, and 1,3,5-triisopropenyl benzene. Also useful are ethylenically unsaturated compounds having a molecular weight of at least 300, e.g., alkylene or a polyalkylene glycol diacrylate prepared from an alkylene glycol of 2 to 15 carbons or a polyalkylene ether glycol of 1 to 10 ether linkages, and those disclosed in U.S. Pat. No. 2,927,022, e.g., those having a plurality of addition polymerizable ethylenic linkages particularly when present as terminal linkages. Particularly preferred monomers are ethoxylated trimethylolpropane triacrylate, ethylated pentaerythritol triacrylate, dipentaerythritol monohydroxypentaacrylate, 1,10-decanediol dimethylacrylate, di-(3-acryloxy-2hydroxylpropyl)ether of bisphenol A oligomers, di-(3-methacryloxy-2-hydroxyl alkyl)ether of bisphenol A oligomers, urethane diacrylates and methacrylates and oligomers thereof, coprolactone acrylates and methacrylates, propoxylated neopentyl glycol diacrylate and methacrylate, and mixtures thereof.

Examples of photoinitiators which are useful in the present invention alone or in combination are described in U.S. Pat. No. 2,760,863 and include vicinal ketaldonyl alcohols such as benzoin, pivaloin, acyloin ethers, e.g., benzoin methyl and ethyl ethers, benzil dimethyl ketal; a-hydrocarbon-substituted aromatic acyloins, including α-methylbenzoin α-allylbenzoin, α-phenylbenzoin, 1-hydroxylcyclohexyl phenol ketone, diethoxyphenol acetophenone, 2-methyl-1-[4(methylthio)-phenyl]-2-morpholino-propanone-1. Photoreducible dyes and reducing agents disclosed in U.S. Pat. Nos. 2,850,445, 2,875,047, 3,097,096, 3,074,974, 3,097,097 and 3,145,104, as well as dyes of the phenazine, oxazine, and quinone classes, Michler's ketone, benzophenone, acryloxy benzophenone, 2,4,5-triphenylimidazolyl dimers with hydrogen donors including leuco dyes and mixtures thereof as described in U.S. Pat. Nos. 3,427,161, 3,479,185 and 3,549,367 can be used as initiators. Also useful with photoinitiators are sensitizers disclosed in U.S. Pat No. 4,162,162. The photoinitiator or photoinitiator system is present in 0.05 to 10% by weight based on the total weight of the photoformable composition. Other suitable photoinitiation systems which are thermally inactive but which generate free radicals upon exposure to actinic light at or below 185° C. include the substituted or unsubstituted polynuclear quinones which are compounds having two intracyclic carbon atoms in a conjugated carbocyclic ring system, e.g., 9,10-anthraquinone, 2-methylanthraquinone, 2-ethylanthraquinone, 2-tertbutylanthraquinone, octamethylanthraquinone, 1,4-naphthoquinone, 9,10-phenanthraquinone, benz(a)anthracene-7,12-dione, 2,3-naphthacene-5,12-dione, 2-methyl-1,4-naphthoquinone, 1,4-dimethylanthraquinone, 2,3-dimethylanthraquinone, 2-phenylanthraquinone, 2,3-diphenylanthraquinone, retenequinone, 7,8,9,10-tetrahydronaphthacene-5,12-dione, and 1,2,3,4-tetrahydrobenz(a)anthracene-7,12-dione; also, alpha amino aromatic ketones, halogenated compounds like trichloromethyl substituted cyclohexadienones and triazines or chlorinated acetophenone derivatives, thioxanthones in presence of tertiary amines, and titanocenes.

Although the preferred mechanism of photoforming is free radical polymerization, other mechanisms of photoforming apply also within the realm of this invention. Such other mechanisms include but are not limited to cationic polymerization, anionic polymerization, condensation polymerization, addition polymerization, and the like.

Other components may also be present in the photoformable compositions, e.g., pigments, dyes, extenders, thermal inhibitors, interlayer and generally interfacial adhesion promoters, such as organosilane coupling agents, dispersants, surfactants, plasticizers, coating aids such as polyethylene oxides, etc. so long as the photoformable compositions retain their essential properties. The plasticizers can be liquid or solid as well as polymeric in nature. Examples of plasticizers are diethyl phthalate, dibutyl phthalate, butyl benzyl phthalate, dibenzyl phthalate, alkyl phosphates, polyalkylene glycols, glycerol, poly(ethylene oxides), hydroxy ethylated alkyl phenol, tricresyl phosphate, triethyleneglycol diacetate, triethylene glycol caprate - caprylate, dioctyl phthalate and polyester plasticizers.

The invention is not limited to the particular embodiments described above, but rather is bounded only by the appended claims and their fair equivalents.

What is claimed is:

1. A method of forming an investment casting mold comprising the steps of:
    (a) placing a photoformable composition comprising thermally-collapsible microspheres in a vat;
    (b) forming a pattern by solid imaging means;
    (c) attaching said pattern to a gate and sprue, formed from a wax, in order to create a pattern cluster;
    (d) dipping said pattern cluster into ceramic slurries in order to create a stucco shell of ceramic layers;
    (e) heating said stucco shell and said pattern cluster to a temperature high enough to collapse said microspheres, melt said gate and sprue, and allow said wax to substantially drain from said stucco shell; and
    (f) firing said stucco shell in order to burn off the pattern and to sinter said stucco shell to form said investment casting mold.

2. A method of forming an investment casting mold as recited in claim 1 wherein said microspheres are thermoplastic microsphere shells.

3. A method of forming an investment casting mold as recited in claim 2 wherein said microspheres comprise isobutane.gas surrounded by a copolymer of vinylidene chloride and acrylonitrile shell.

* * * * *